United States Patent [19]
Russell et al.

[11] Patent Number: 5,446,774
[45] Date of Patent: Aug. 29, 1995

[54] SPUD FINGER GAUGE

[75] Inventors: Harry I. Russell, Campbell; Bettadapur N. Sridhar, Cupertino, both of Calif.

[73] Assignee: General Electric Company, San Jose, Calif.

[21] Appl. No.: 196,736

[22] Filed: Feb. 15, 1994

[51] Int. Cl.6 .............................................. G21C 17/00
[52] U.S. Cl. ........................................ 376/245; 81/10; 81/59.1; 33/533; 33/543; 33/558.09
[58] Field of Search ................... 376/245; 81/10, 59.1; 33/533, 543, 558.09

[56] References Cited

U.S. PATENT DOCUMENTS

| | | | |
|---|---|---|---|
| 3,785,059 | 1/1974 | Breau | 33/147 K |
| 4,058,901 | 11/1977 | Lendi et al. | 33/178 R |
| 4,092,213 | 5/1978 | Nishimura | 376/223 |
| 4,094,369 | 6/1978 | Blanc et al. | 177/147 |
| 4,543,638 | 9/1985 | Scarffe | 364/513 |
| 4,696,190 | 9/1987 | Buchel et al. | 73/865.8 |
| 4,790,073 | 12/1988 | DuPlanti | 33/178 B |
| 4,790,079 | 12/1988 | Meyers | 33/517 |
| 4,863,673 | 9/1989 | Carruth | 376/230 |
| 4,868,992 | 9/1989 | Crafts et al. | 33/533 |
| 5,315,259 | 5/1994 | Jostein | 324/658 |

*Primary Examiner*—Donald P. Walsh
*Assistant Examiner*—Meena Chelliah
*Attorney, Agent, or Firm*—J. E. McGinness

[57] ABSTRACT

A tool for checking the required spacing between adjacent fingers of the spud in a control rod drive. The tool is a GO-NO-GO gauge with tight tolerance. The spud finger gauge has two circular cylindrical pins of different diameter. One pin (i.e., the GO pin) has a diameter less than the required spacing between adjacent fingers of the spud. The other pin (i.e., the NO GO pin) has a diameter greater than the required spacing between adjacent fingers of the spud. The spacing is correct if the GO pin passes through the spacing and the NO GO pin does not.

9 Claims, 5 Drawing Sheets

SPUD FINGER GAUGE

FIELD OF THE INVENTION

This invention relates generally to maintenance of a control rod drive of a boiling water reactor. Specifically, the invention relates to tools for inspecting a control rod drive during a maintenance operation.

BACKGROUND OF THE INVENTION

Control rod drives (CRDs) are used to position control rods in boiling water reactors (BWRs) to control the fission rate and fission density, and to provide adequate excess negative reactivity to shutdown the reactor from any normal operating or accident condition at the most reactive time in core life. Referring to FIG. 1, each CRD is mounted vertically in a CRD housing 10 which is welded to a stub tube 8, which in turn is welded to the bottom head of the reactor pressure vessel 4. The CRD flange 6 is bolted and sealed to the flange 10a of the CRD housing 10, which contains ports for attaching the CRD hydraulic system lines 80, 81. Demineralized water supplied by the CRD hydraulic system serves as the hydraulic fluid for CRD operation.

As shown schematically in FIG. 1, the CRD is a double-acting, mechanically latched hydraulic cylinder. The CRD is capable of inserting or withdrawing a control rod (not shown) at a slow controlled rate for normal reactor operation and of providing rapid control rod insertion (scram) in the event of an emergency requiring rapid shutdown of the reactor. A locking mechanism in the CRD permits the control rod to be positioned at 6-inch (152.4-mm) increments of stroke and to be held in these latched positions until the CRD is actuated for movement to a new position. A spud 46 at the top of the index tube 26 (the moving element) engages and locks into a socket at the bottom of the control rod. Once coupled, the CRD and control rod form an integral unit which must be manually uncoupled by specific procedures before a CRD or control rod may be removed from the reactor.

When installed in the reactor, the CRD is wholly contained in housing 10. The CRD flange 6 contains a withdraw port 70 and an insert port 66 with an integral two-way check valve (with a ball 20). For normal drive operation, drive water is supplied via an associated hydraulic control unit (HCU) to the insert port 66 for drive insertion and/or to withdraw port 70 for drive withdrawal. For rapid shutdown, the check valve directs external hydraulic pressure or reactor pressure to the underside of drive piston 24. When higher than the external hydraulic pressure, reactor pressure is admitted to the two-way check valve from the annular space between the CRD and a thermal sleeve (not shown) through passages in the CRD flange, called scram vessel ports.

Referring to FIG. 2, the CRD further comprises an inner cylinder 57 and an outer tube 56, which form an annulus under a collet piston 29b through which water is applied to the collet piston to unlock index tube 26. A collet housing 51 (which is part of outer tube 56) is provided with ports 73 to permit free passage of water from the clearance space between the outer diameter of index tube 26 and the inner diameter of inner cylinder 57 and the inner diameter of collet housing 51. The bottom of collet piston 29b normally rests against a spacer 52 in the upper portion of the annular space. Grooves in the spacer permit the passage of water between the bottom of the collet piston 29b and the passage area within the cylinder, tube and flange.

Returning to FIG. 1, welded pipes 80 and 81 port water to the insert port 66, containing a check-valve ball 20, and the withdraw port 70 respectively. A port 69 below outer tube 56 connects to withdraw port 70 in CRD flange 6 so that water is applied through the under-the-collet-piston annulus to collet piston 29b when a withdraw signal is given.

Port 66 is connected internally to the annulus under the drive piston 24 and serves as the inlet for water during normal insertion or scram. Water enters this port for a brief period in response to a withdraw signal to move the index tube 26 upward so that collet fingers 29a are cammed out. Following this brief unlocking period, water from below drive piston 24 is discharged through port 66 and through the under-piston hydraulic line for the duration of the withdraw signal.

The withdraw port 70 serves as the inlet port for water during control rod withdrawal and as the outlet port for water during normal or scram insertion. It connects with internal porting and annuli to the area above drive piston 24. During a withdraw operation, water is supplied from port 70 through a small connecting port in CRD flange 6 to the annular space between outer tube 56 and inner cylinder 57 for application to the bottom of collet piston 29b.

The locking mechanism consists of collet fingers 29a, collet piston 29b, barrel 35, guide cap 39, and collet spring 31. The mechanism is contained in the collet housing 51 portion of outer tube 56 and is the means by which index tube 26 is locked to hold the control rod at a selected position.

The collet assembly consists of a collet piston 29b fitted with two expansion piston seal rings 28 and two contraction piston seal rings 27, six fingers 29a and a retainer (not shown) and is set into a bore in the collet housing 51. In addition, a spring 31, barrel 35 and guide cap 39 complete the components installed in the collet housing 51.

Guide cap 39 is held in place above the collet by three plugs 37 which penetrate the upper end of collet housing 51, and which are held in place by fillister-head screws. It provides a fixed camming surface to guide collet fingers 29a upward and away from index tube 26 when unlocking pressure is applied to collet piston 29b. Barrel 35 is installed below guide cap 39 and serves as fixed seat for collet spring 31.

The collet mechanism requires a hydraulic pressure greater than reactor pressure to unlock for CRD-withdraw movement. A preload is placed on collet spring 31 at assembly and must be overcome before the collet can be moved toward the unlocked position. For control rod withdrawal, a brief insert signal is applied to move index tube 26 upward to relieve the axial load on collet fingers 29a, camming them outward against the sloping lower surface of index tube locking notch 55. Immediately thereafter, withdraw pressure is applied. In addition to moving index tube 26 downward, this pressure is at the same time applied to the bottom of collet piston 29b to overcome the spring pressure and cam the fingers 29a outward against guide cap 39. When the withdraw signal ceases, the spring pressure forces the collet downward so that fingers 29a slip off guide cap 39. As index tube 26 settles downward, collet fingers 29a snap into the next higher notch and lock. When collet fingers 29a engage a locking notch 55, collet piston 29b transfers the control rod weight from index tube 26 to the outer tube 56.

Unlocking is not required for CRD insertion. The collet fingers are cammed out of the locking notch as index tube 26 moves upward. The fingers 29a grip the outside wall of index tube 26 and snap into the next lower locking notch for single-notch insertion to hold index tube 26 in position. For scram insertion, index tube 26 moves continuously to its limit of travel during which the fingers snap into and cam out of each locking notch as index tube 26 moves upward. When the insert, withdraw or scram pressures are removed, index tube 26 settles back, from the limit of travel, and locks to hold the control rod in the required position.

The drive piston 24 and index tube 26 are the primary subassembly in the CRD, providing the driving link with the control rod as well as the notches for the locking mechanism collet fingers. Drive piston 24 operates between positive end stops, with a hydraulic cushion provided at the upper end only. Index tube 26 is a nitrided stainless-steel tube threaded internally at both ends. The spud 46 is threaded to its upper end, while the head of the drive piston 24 is threaded to its lower end. Both connections are secured in place by means of bands 25, 25' with tab locks.

There are 25 notches machined into the wall of index tube 26, all but one of which are locking notches 55 spaced at 6-inch intervals. The uppermost surfaces of these notches engage collet fingers 29a, providing 24 increments at which a control rod may be positioned and preventing inadvertent withdrawal of the rod from the core. The lower surfaces of the locking notches slope gradually so that the collet fingers cam outward for control rod insertion.

When a control rod is driven upward to its fully inserted position during normal operation or scram, the upper end of the piston head (not shown) contacts the spring washers 30 which are installed below the stop piston 33. Washers 30 and stop piston 33 provide the upper limit of travel for drive piston 24. The spring washers, together with the series of buffer orifices 53 in the upper portion of piston tube 15, effectively cushion the moving drive piston 24 and reduce the shock of impact when the piston head contacts the stop piston.

A stud 59 is welded to the upper end of tube piston 15. Stud 59 is threaded for mounting the stop piston 33. A shoulder on the stud, just below the threaded section, is machined to provide a recess for the spring washers 30 that cushion the upward movement of drive piston 24. The stop piston 33 provides the seal between reactor pressure and the area above the drive piston. It also functions as a positive-end stop at the upper limit of drive piston travel. Seals 34 include an upper pair used to maintain pressure above the drive piston during CRD withdrawal and a lower pair used only during the cushioning of the drive piston at the upper end of the stroke. Two external bushings 32 prevent metal-to-metal contact between stop piston 33 and index tube 26.

An outer filter 45 and the inner filter 41 are installed near the upper end of the CRD. The outer filter is mounted on guide cap 39 using screws 40. A center lug 44 at the top of stop piston 33 is provided for mounting inner filter 41. The inner filter is held in place by a spring clip 42 which grips lug 44. Both filters are provided to filter reactor water flowing into the CRD, removing foreign particles or abrasive matter that could result in internal damage and excessive wear. The inner filter is sealed by means of a seal ring 50 installed in a groove in the outer circumferential surface of the inner filter ring.

As seen in FIG. 3, spud 46, which connects the control rod 90 and the CRD, is threaded onto the upper end of index tube 26 and held in place by locking band 25'. The coupling arrangement will accommodate a small amount of angular misalignment between the CRD and the control rod. Six spring fingers 46a permit the spud to enter the mating socket 92 on the control rod. A lock plug 94 then enters spud 46 from socket 92 and prevents uncoupling.

Two uncoupling mechanisms are provided. The lock plug 94 may be raised against the return force of a spring 95 by an actuating shaft 96. The control rod, with lock plug 94 raised, may then be lifted from the CRD. The lock plug may also be raised from below to uncouple the CRD from below the reactor vessel. To accomplish this, a special tool is attached to the bottom of the CRD and used to raise the piston tube 15 (see FIG. 1). This raises an uncoupling rod, lifting lock plug 94 so that spud 46 disengages from the control rod coupling socket 92.

The uncoupling rod consists of a rod 48 and a tube 43, supported in the base of the spud at the upper end of the CRD (see FIGS. 2 and 3). The rod 48 is welded to the flared end of tube 43 such that a dimension of 1.125 inches exists between the top of rod 48 and the top end of spud 46. This is a critical dimension and must be maintained to ensure proper CRD and control-rod coupling. For this reason, uncoupling rods cannot be interchanged unless the critical dimension is verified. In addition to its function in uncoupling, rod 48 positions the control rod lock plug 92 such that it supports (i.e., opposes radially inward deflection of) the spud fingers 46a when the control rod and CRD are coupled.

During maintenance of a CRD, the spud is removed using a spud wrench having three dowel pins. As shown in FIGS. 4A and 4B, the spud has a cloverleaf-shaped through-hole comprising a central hole 98 for receiving the tube 43 (see FIG. 4B) and three spud flow holes 99 intersecting the central hole 98 at equal angular intervals along its periphery. The spud is removed after the uncoupling rod 48 and tube 43 welded thereto have been removed. The three dowel pins (not shown) of the spud wrench are inserted into the corresponding spud flow holes 99, thereby form-locking spud 46 to the spud removal tool. The dowel pins are sized to form-lock in the flow holes 99 of spud 46 with little play.

SUMMARY OF THE INVENTION

The present invention is a tool for checking the required spacing between adjacent fingers of the spud in a control rod drive. The gauge not only checks the spacing between the fingers, but also indirectly checks the inside and outside diameters of the spud fingers, as these three features are interrelated. The tool is a GO-NO-GO gauge with tight tolerance. The gauge is used to assure proper seating of the spud in the coupling socket of a control rod.

The spud finger gauge in accordance with the preferred embodiment of the invention has two circular cylindrical pins of different diameter. One pin (i.e., the GO pin) has a diameter less than the required spacing between adjacent fingers of the spud. The other pin (i.e., the NO GO pin) has a diameter greater than the required spacing between adjacent fingers of the spud. The spacing is correct if the GO pin passes through the spacing along its entire height and the NO GO pin does not.

DETAILED DESCRIPTION OF THE PREFERRED EMBODIMENTS

Figure 1:
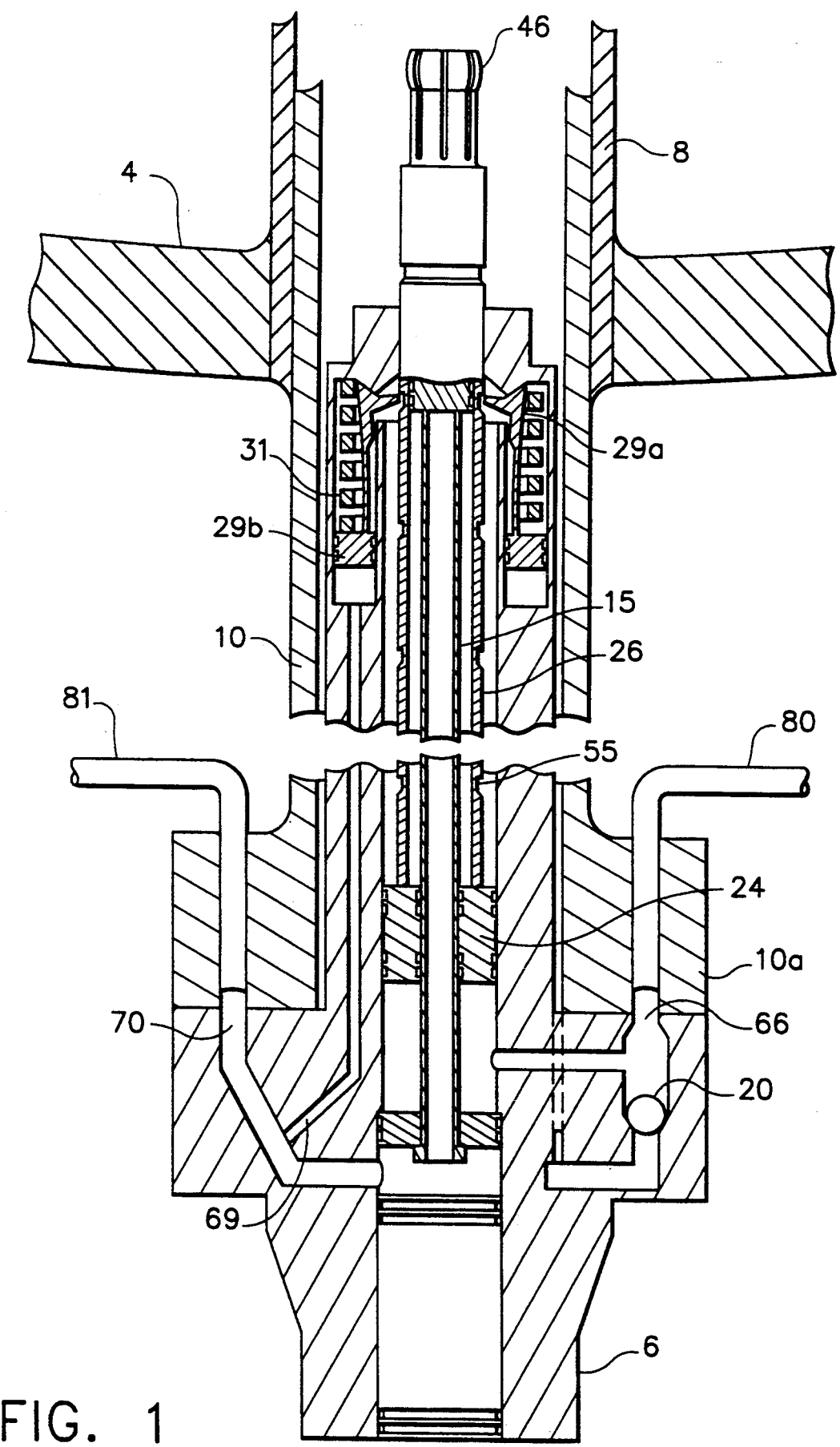
FIG. 1 is a sectional schematic of a conventional control rod drive installed in a BWR.
Figure 2:
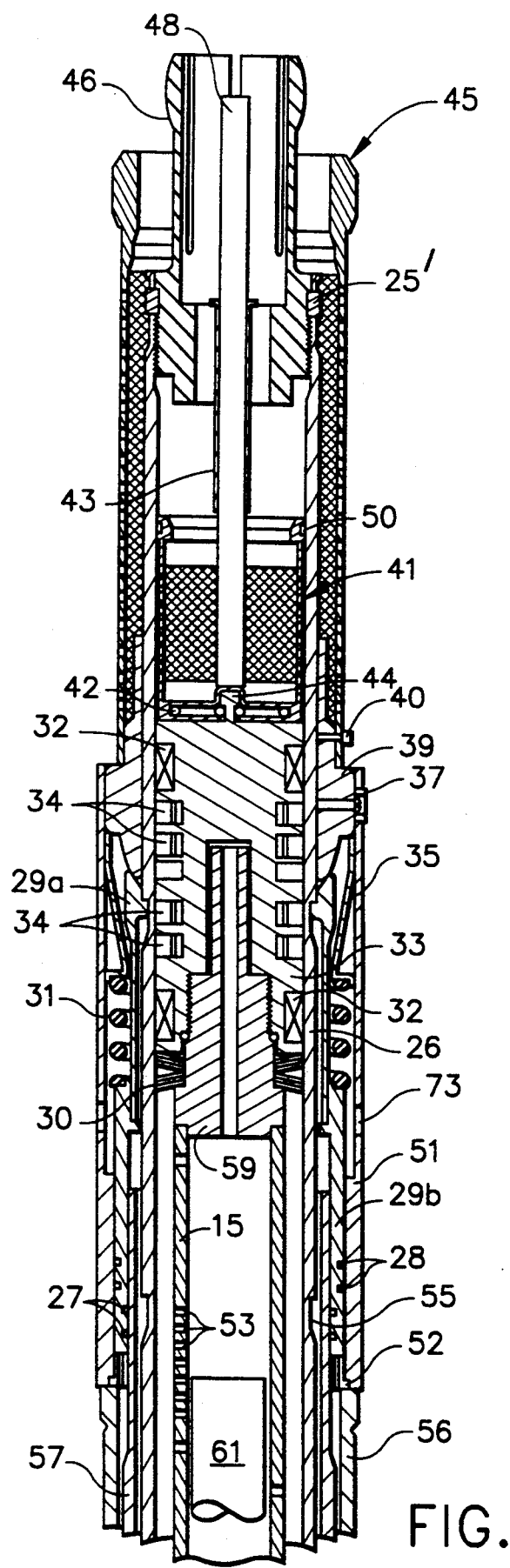
FIG. 2 is a sectional view of the upper portion of a conventional control rod drive.
Figure 3:
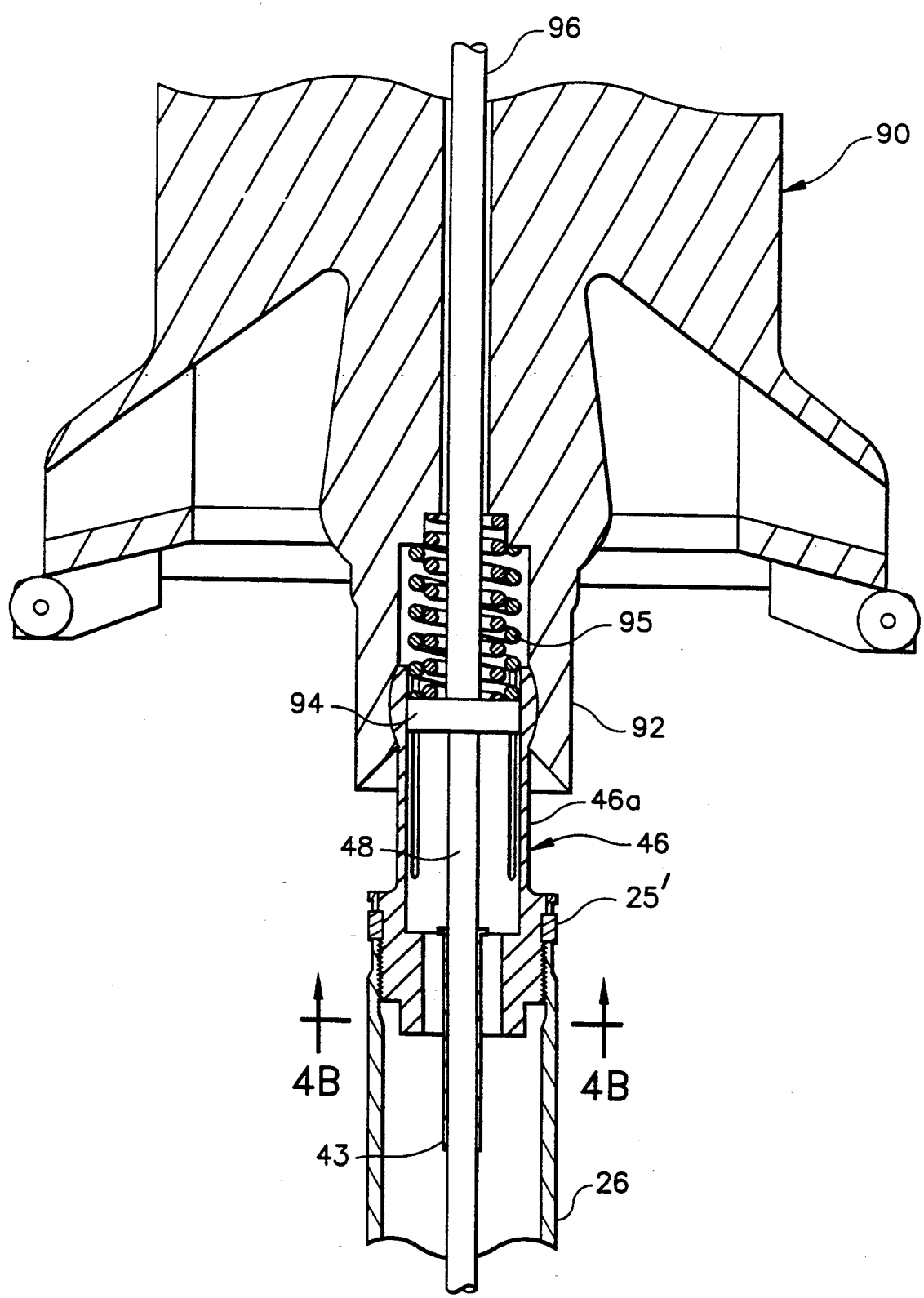
FIG. 3 is a sectional view of a conventional coupling of a control rod to a control rod drive.
Figure 4A:
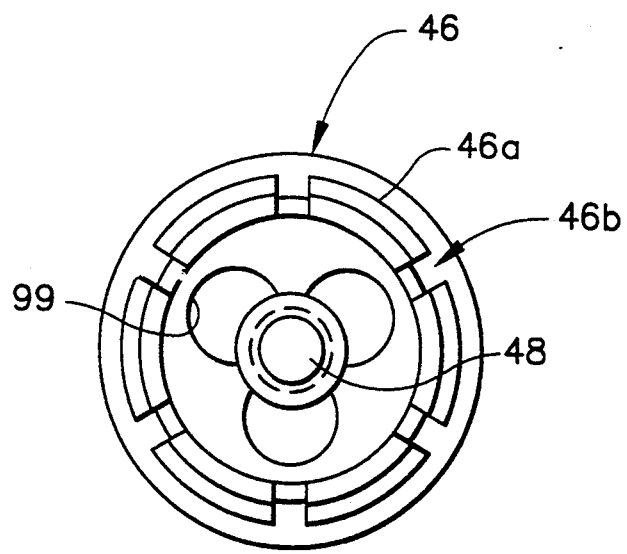
FIGS. 4A and 4B are respective top and sectional views of a conventional spud and uncoupling rod.
Figure 4B:
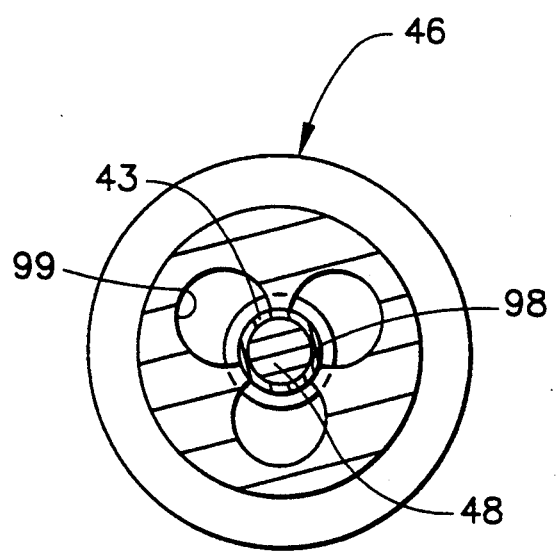
Figure 5:
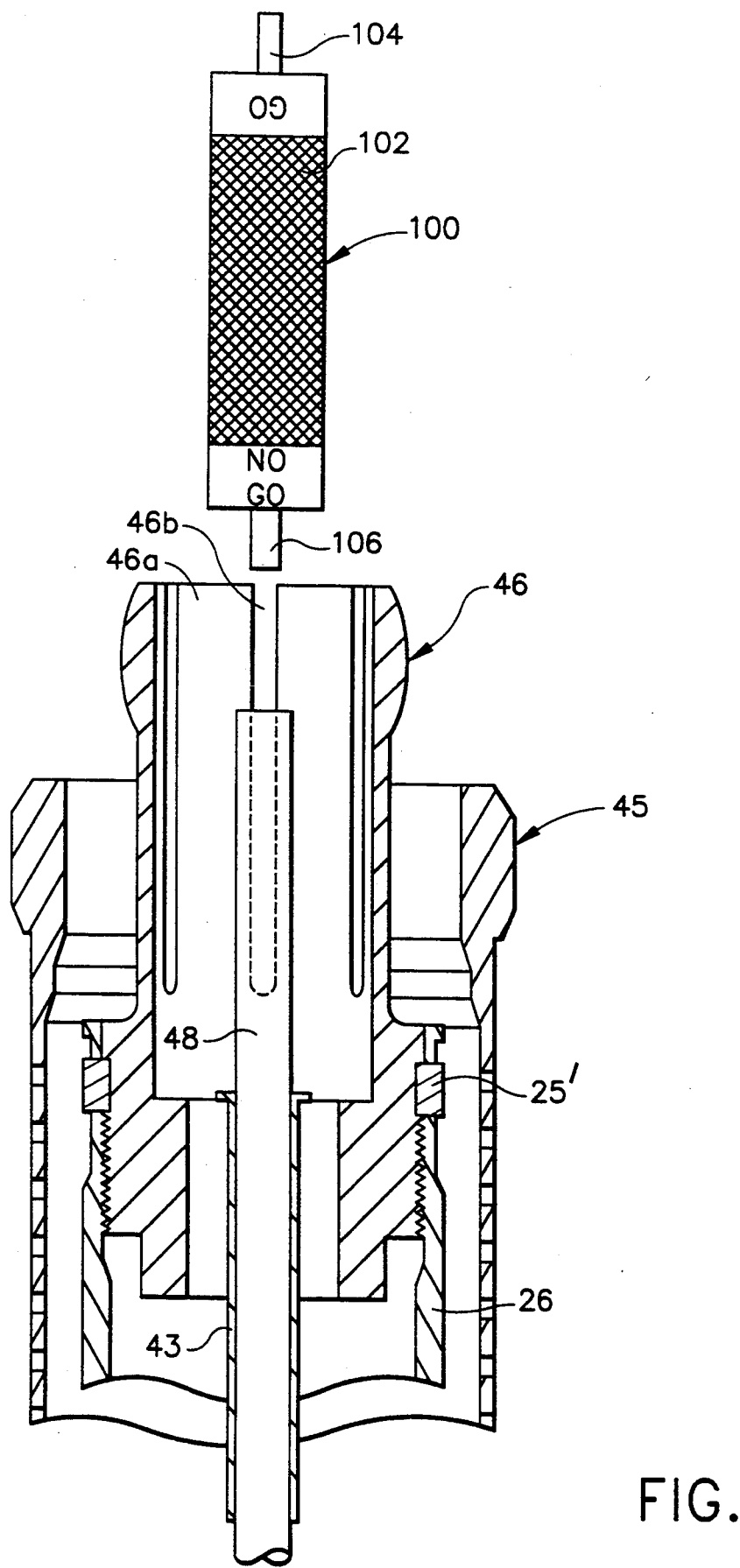
FIG. 5 is a plan view of the spud finger gauge in accordance with a preferred embodiment of the invention, in spaced relationship with a spud finger spacing.

In accordance with a preferred embodiment of the invention depicted in FIG. 5, the spud finger gauge 100 comprises a handle 102, preferably but not necessarily circular cylindrical, having a knurled outer surface. One end of the handle labeled GO has a pin 104 extending therefrom along the axis of the handle. The other end of the handle labeled NO GO has a pin 106 extending therefrom along the axis of the handle. Both pins are preferably circular cylindrical in shape. Pin 104 (i.e., the GO pin) has a diameter less than the required spacing 46b between adjacent fingers 46a of the spud 46. Pin 106 (i.e., the NO GO pin) has a diameter greater than the required spacing 46b. Alternatively, the pins could be cylinders of square cross section, the GO pin having a width less than the required spacing between adjacent spud fingers and the NO GO pin having a width greater than the required spacing between adjacent spud fingers. The pins may have other suitable geometries which are apparent to persons skilled in the art of tooling.

In accordance with the test procedure of the invention, the inspector inserts the GO pin 104 into the inlet of a spacing 46b between adjacent spud fingers 46a and attempts to traverse the entire height of the spacing with the GO pin. The inspector then tries to traverse the same spacing in the same manner using the NO GO pin 106. The spud finger spacing 46b is considered acceptable if the GO pin 104 fits easily between the adjacent spud fingers 46a and the NO GO pin 106 does not. The spud finger spacing is considered unacceptable if either of two events occurs: (1) the GO pin 104 does not fit between the adjacent spud fingers; or (2) the NO GO pin fits between the adjacent spud fingers.

The foregoing checking procedure using the GO-NO-GO gauge is performed for each of the six spacings 46b between adjacent fingers 46a of the spud 46. If each spacing passes the test, this indicates that the spud fingers are in proper alignment around the circumference of the spud and have not been bent radially inward or radially outward as the result of any damage inflicted during a maintenance operation.

A known conventional spud has a finger spacing with a specified width of 0.22±0.02 inch, i.e., the spacing may range between 0.20 and 0.24 inch. To check that the spacings all fall within this predetermined range, an exemplary spud finger gauge was built with a GO pin diameter of 0.1990±0.0005 inch and a NO GO pin diameter of 0.2410±0.0005 inch. The handle for this exemplary gauge had a diameter of 1 inch and a length (measured from pin tip to pin tip) of 6 inches.

Preferably, the spud finger gauge in accordance with the present invention is cast as a unitary piece of corrosion-resistant hardened stainless steel, e.g., Nitronic 60, for wear resistance.

The preferred embodiment of the spud finger gauge has been disclosed for the purpose of illustration. Variations and modifications of the disclosed structure which do not depart from the concept of this invention will be readily apparent to mechanical engineers skilled in the art of tooling. All such variations and modifications are intended to be encompassed by the claims set forth hereinafter.

We claim:

1. A spud finger gauge comprising a handle having first and second ends, a first cylindrical projection integrally connected to said first end of said handle and having a transverse dimension of first magnitude and a second cylindrical projection integrally connected to said second end of said handle and having a transverse dimension of second magnitude, said first and second magnitudes being selected such that said first and second cylindrical projections respectively pass and do not pass through a spud finger spacing having a width of third magnitude, said third magnitude being within a predetermined range of magnitudes defined by a minimum acceptable magnitude and a maximum acceptable magnitude, wherein said first magnitude is less than said minimum acceptable magnitude and said second magnitude is greater than said maximum acceptable magnitude.

2. The spud finger gauge as defined in claim 1, wherein said first cylindrical projection has a circular cross section of first diameter and said second cylindrical projection has a circular cross section of second diameter, said first magnitude being said first diameter and said second magnitude being said second diameter.

3. The spud finger gauge as defined in claim 2, wherein said handle is a circular cylinder having an axis, said first and second cylindrical projections being disposed at opposite ends of said handle coaxial with said axis.

4. The spud finger gauge as defined in claim 3, wherein said handle has a knurled surface.

5. The spud finger gauge as defined in claim 1, wherein said handle and said first and second cylindrical projections are made of corrosion-resistant hardened stainless steel.

6. A method for checking the condition of a spud in a control rod drive, said spud having a plurality of fingers and a plurality of spacings, said fingers being arranged along a circumference with a corresponding one of said plurality of spacings separating each pair of adjacent fingers, comprising the steps of:
 (a) trying to pass a first cylindrical projection having a transverse dimension of first magnitude through a first spacing of said plurality of spacings; and
 (b) trying to pass a second cylindrical projection having a transverse dimension of second magnitude through said first spacing,
wherein said first and second magnitudes are selected such that said first and second cylindrical projections respectively pass and do not pass through any spacing separating adjacent fingers of an undeformed spud having a spacing width of third magnitude, said third magnitude being within a predetermined range of magnitudes defined by a minimum acceptable magnitude and a maximum acceptable magnitude, wherein said first magnitude is less than said minimum acceptable magnitude and said second magnitude is greater than said maximum acceptable magnitude.

7. The method as defined in claim 6, wherein said steps (a) and (b) are repeated for every other one of said plurality of spacings.

8. The method as defined in claim 6, wherein said first cylindrical projection has a circular cross section of first diameter and said second cylindrical projection has a circular cross section of second diameter, said first magnitude being said first diameter and said second magnitude being said second diameter.

9. The method as defined in claim 6, wherein said predetermined range of magnitudes corresponds to the tolerances for spacing width in an undeformed spud.

* * * * *